United States Patent [19]

Timmins et al.

[11] 4,246,117
[45] Jan. 20, 1981

[54] PLURAL DRIVES EACH DRIVING PLURAL FILTER PRESS PLATE ENGAGING HOOKS

[75] Inventors: Stephen F. Timmins, Knutsford; Alan Kettle, Disley, both of England

[73] Assignee: The Clayton Aniline Company Limited, Manchester, England

[21] Appl. No.: 16,614

[22] Filed: Mar. 1, 1979

[30] Foreign Application Priority Data

Mar. 1, 1978 [GB] United Kingdom ............... 8062/78

[51] Int. Cl.³ ............................................. B01D 25/12
[52] U.S. Cl. ................................... 210/230; 100/200
[58] Field of Search ............... 210/230, 224, 225; 100/199, 200

[56] References Cited

U.S. PATENT DOCUMENTS

| 3,270,887 | 9/1966 | Juhasz et al | 210/225 |
| 3,306,455 | 2/1967 | Fismer | 210/236 |
| 4,032,450 | 6/1977 | Iwatani | 210/230 |
| 4,105,560 | 8/1978 | Fismer | 210/230 |
| 4,171,266 | 10/1979 | Kurita et al | 210/230 |

FOREIGN PATENT DOCUMENTS

| 47-590 | 8/1972 | Japan | 100/196 |
| 829711 | 3/1960 | United Kingdom | 210/230 |
| 874093 | 8/1961 | United Kingdom | 210/230 |
| 876010 | 8/1961 | United Kingdom | 100/199 |
| 1234787 | 6/1971 | United Kingdom | 210/230 |
| 1263809 | 2/1972 | United Kingdom | 210/230 |
| 1438455 | 6/1976 | United Kingdom | 100/196 |

Primary Examiner—Charles N. Hart
Assistant Examiner—David R. Sadowski
Attorney, Agent, or Firm—Wenderoth, Lind & Ponack

[57] ABSTRACT

A filter press includes a plurality of plates made of a rigid material resting on a pair of parallel horizontal supports by means of lugs extending from opposite sides of the plates. The supports are attached at one end to a fixed headstock having a liquid inlet and at the other end to a hydraulic ram assembly, each plate supporting a sheet of filter material, and being mounted in a row so that they can be arranged in a first, working, configuration wherein they are all clamped together and a second, cleaning, configuration wherein there is a gap between a selected two of the plates to allow removal of residue therefrom. The filter press has a drive which operates to move the plates one by one into abutting relationship adjacent the headstock before they are clamped by the ram action and which can be reversed to separate the plates and move them one by one to positions remote from the headstock for cleaning so that the gap between any selected two of the plates is constant.

5 Claims, 11 Drawing Figures

PLURAL DRIVES EACH DRIVING PLURAL FILTER PRESS PLATE ENGAGING HOOKS

BACKGROUND OF THE INVENTION the present invention relates to a filter press of the type hereinafter referred to as "of the type described" which comprises a plurality of plates each supporting a sheet of filter material, the plates being mounted in a row so that they can be arranged in a first, working, configuration wherein they are all clamped together and a second, cleaning, configuration wherein there is a gap between a selected two of the plates to allow removal of residue therefrom. The plates may be made of a rigid material such as ebonite, timber, cast iron or polypropylene with or without the incorporation of flexible membranes.

A known filter press of this type has a pair of parallel horizontal supports upon which rest lugs extending from opposite sides of the plates. Each plate is of cast iron and some four feet square by four inches thick. At one end the supports are attached to a fixed headstock having a liquid inlet and at the other end they are attached to a hydraulic ram assembly. In use the ram presses the plates tightly together and against the headstock. After filtration, the residue may, if desired, be washed and dried while within the plates pressed tightly together.

When it is necessary to remove residue from the plates the ram is withdrawn and the last plate, i.e. the plate remote from the headstock, is moved away from the remainder of the plates usually by a drive of some sort, and the residue is manually dislodged therefrom to fall into a collection vessel below the press. When the last plate is clean the next last plate is moved away from the remainder to a position close to the last plate and is itself cleaned. This process is repeated until all the plates are clean. The ram is then actuated to move all the plates simultaneously back to their working positions clamped against the headstock.

This known machine has two disadvantages. Firstly, the drive used to separate the plates for cleaning is such that a gap of one half to one inch-can be left between the plates as they are moved towards the ram. This means that whereas the gap between the last and next-to-last plates is quite long and makes for easy cleaning, the gap left between the first and second plates is much reduced and cleaning is more difficult. This has lead to the practice of separating the filter plates manually which is extremely laborious.

Secondly, and more seriously, the practice of using the ram to clamp all the plates simultaneously can result in very severe stresses being applied to the headstock and damage can be caused thereto.

This can happen whenever the plates in the pack are not parallel to the plane of the headstock as they advance towards it under the action of the ram. This discrepancy arises in various ways but can be observed and measured as it occurs in varying degree during the ram closure operation on presses of the type described where the plates can swing and are not positively held parallel to the headstock. Once the discrepancy has arisen the plates do not usually align themselves parallel to the headstock as the press closes because frictional forces prevent the sliding of the plates relative to each other.

Thus proper concentric compression with even distribution of force within the pack is prevented and this tends to promote leakage of process fluid during operation as well as distortion of the headstock and general structure of the press. In extreme cases the leakage is obvious and excessive and the eccentric loadings which arise can produce dangerous distortion of the structure of the press.

SUMMARY OF THE INVENTION

An object of the present invention is to provide an improved filter press which overcomes at least one of the aforementioned disadvantages.

Accordingly the invention provides a filter press of the type described having a drive which operates to move the plates one by one into abutting relationship adjacent the headstock before they are clamped by the ram action and which can be reversed to separate the plates and move them one by one to positions remote from the headstock for cleaning so that the gap between any selected two of the plates is constant.

In one embodiment the drive comprises, on each side of the press, a chain or cable driven by a stall motor and having a catch which can engage lugs on the plates. Alternatively, instead of the chains or cables the drive can include a pair of lead screws carrying nuts or a pair of hydraulic or pneumatic rams. A separate motor drives each chain (or a single motor with differential gear) to equalise the driving forces on each side.

The invention will be described further, by way of example with reference to a preferred embodiment thereof.

A preferred embodiment of filter press conforming to the invention has a headstock, a hydraulic ram and a pair of parallel horizontal support rails, about four feet apart extending therebetween. A plurality of cast iron plates, each four feet square and about four inches thick, are disposed between the rails, and lugs extending from the sides of the plates just above their centres of gravity rest on the rails and support the plates for sliding movement therealong.

Mounted on or parallel to each support rail is a drive in the form of an endless chain or cable mounted for rotation about two sprockets or capstans one at each end of the rail. Each of the sprockets or capstans at the headstock end of the rails is connected independently to a separate stall motor, which can be hydraulic, pneumatic or electric. Each chain or cable carries a hook catch arrangement which can operate in both directions, for engaging the lugs on the plates. An actuator bar or cord runs the length of the press on one or both sides thereof and is connected to switchgear controlling the motors. Depression of the bar or cord by an operative alternately stops and starts the motors.

When the plates are to be separated for cleaning, the ram having been withdrawn to leave the filled plates closely packed adjacent the headstock, the hooks will normally lie adjacent the ram end. The hooks are adjusted, e.g. by turning, to ensure that they can operate to move plates towards the ram. After switching on the power to the motors by the bar or cord, the hooks, carried by the chains, move towards the pack of plates. When the hooks have passed the lugs on the last plate (i.e. the plate furthest from the headstock) the drive automatically reverses and the hooks, on this run, engage the lugs on said last plate and move it towards the ram structure. When this plate is pressed against the ram structure with a force equivalent to the stall point of the motors, stalling occurs and the motors automatically reverse after a suitable delay which can be predetermined. During this delay, the operator switches off the power and cleans the last plate.

When the last plate is cleaned power is switched on and the process is repeated for the next to last plate, and the succeeding plates until all have been cleaned. In cases where small forces only are required for plate transport it could be permissable for the manual cleaning to be carried out during the automatic delay period but this would depend on local regulations, circumstances and safeguards.

It will be appreciated that the drive is effective to move the plates from a close packed position adjacent the headstock to a similar close packed position remote from the headstock. This has the effect that the space available for cleaning the first plate is the same as that for the last plate, with the consequent advantages of accessibility.

When all the plates have been cleaned the hooks are reversed and the drive used to replace the plates in their use position in a pack adjacent the headstock. This replacement is done individually plate by plate so that each plate, as it is moved to its use position, is placed in contact with the last-replaced plate firmly and in good sealing relation.

Gross misalignment and eccentricity of the closing force, exerted by the ram and arising from the discrepancy described, is prevented. Distortion of the headstock and press structure and the tendency for leaks within the pack is reduced.

BRIEF DESCRIPTION OF THE DRAWINGS

One example of the manner in which the hook catch operates is illustrated in the accompanying drawings in which.

DETAILED DESCRIPTION OF THE INVENTION

Figure 1:
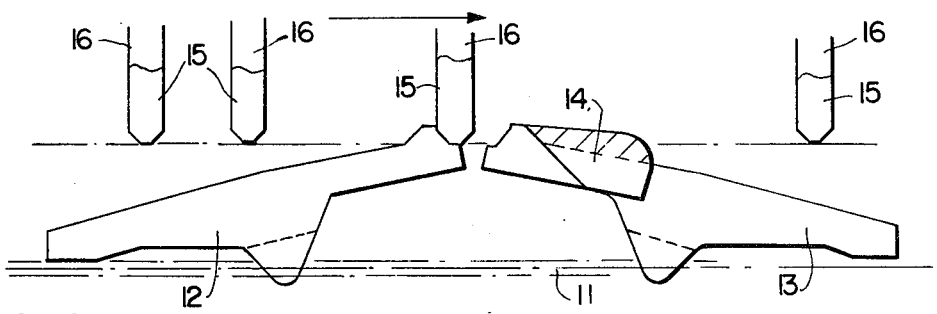
FIG. 1 is a side view of part of a filter press according to a first embodiment of the invention, showing the hooks engaging a lug of one plate to transport it towards the headstock end, the direction of travel being indicated by the arrow.

Referring to FIGS. 1 to 4 of the drawings, one embodiment of the filter press is provided with a horizontal support rail parallel to which is mounted a chain 11 carrying hooks 12 and 13 and driven by a stall motor (not shown). A loose cam 14 is attached to hook 13. Lugs 15 extending from the sides of cast iron plates 16 rest on the support rail for sliding movement therealong.

Figure 2:
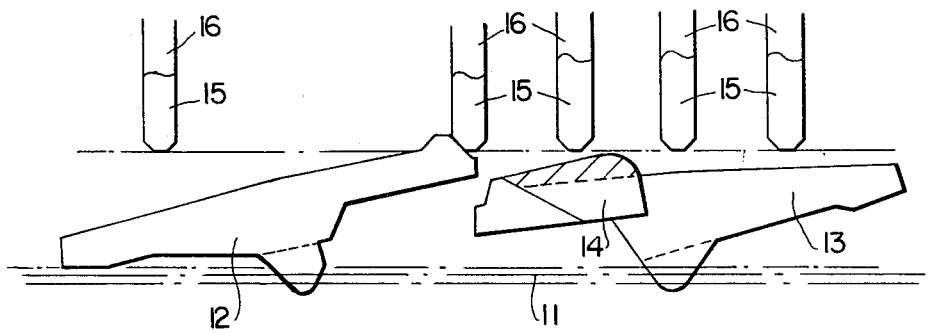
FIG. 2 is a side view of part of the filter press of FIG. 1, showing the hooks immediately after transporting the lug to the headstock and when stalling of the motor occurs.

To move a plate 16 to the headstock end, power is switched on and the hook 12 engages a lug 15 and transports it to the headstock end as shown in FIG. 1. When this plate 16 is pressed against another plate 16 as shown in FIG. 2, stalling of the motor occurs.

Figure 3:
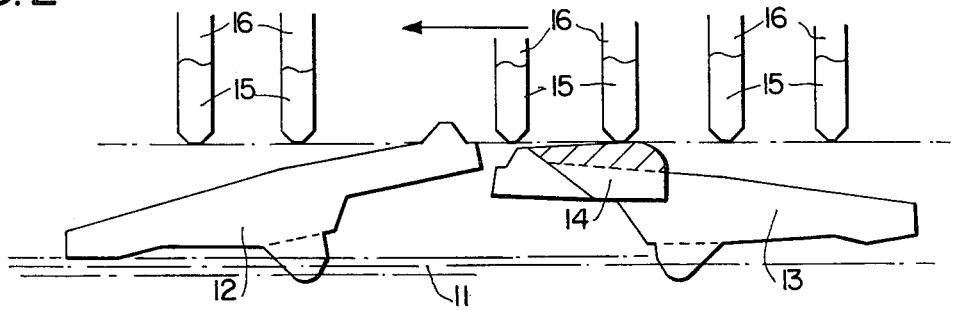
FIG. 3 is a side view of part of the filter press of FIG. 1, showing the early part of return of the hooks, the direction of travel being indicated by the arrow.
Figure 4:
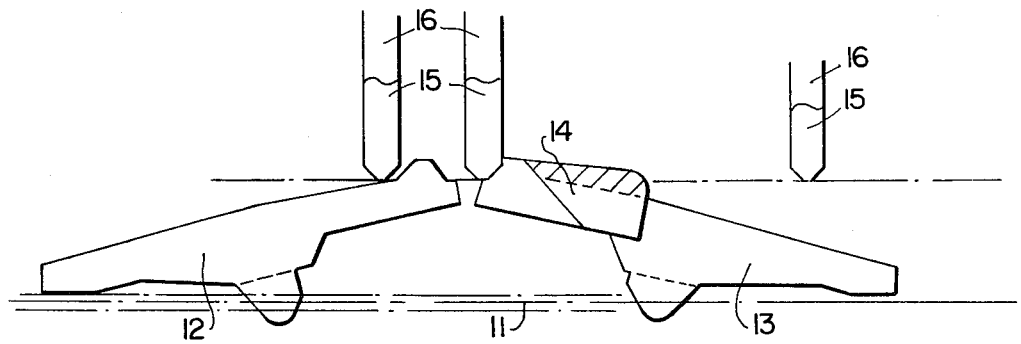
FIG. 4 is a side view of part of the filter press of FIG. 1, showing the hooks after return to the end of the filter press remote from the headstock when stalling of the motor occurs.
Figure 5:
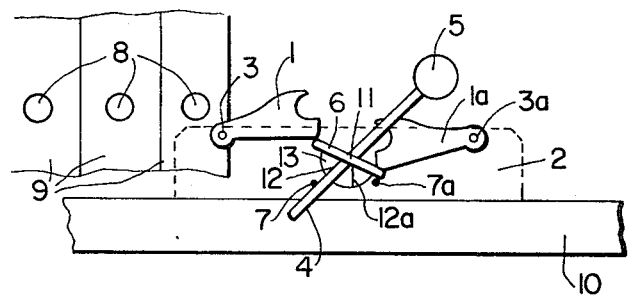
FIGS. 5–11 are views similar to FIGS. 1–4, but illustrating the sequence of operations of a filter press according to a second embodiment of the invention.

The motor automatically reverses. Hooks 12, 13 move towards the ram end as shown in FIG. 3. Loose cam 14 prevents engagement of hook 13 with the plate last moved. The hook 13 then presses against the lug 15 of the next plate 16 as shown in FIG. 4, causing stalling of the motor. The motor automatically reverses and hook 12 engages the lug 15 and the process is repeated until all the plates are moved one by one into abutting relationship adjacent the headstock where they can be clamped together by the ram.

To reverse the process to separate the plates and move them one by one to positions remote from the headstock for cleaning, the loose cam 14 is transferred from hook 13 to hook 12 and by a similar porcess the plates are transported in the opposite direction to that shown in the drawings.

In one example of an operative filter press one such hook catch arrangement is present adjacent to each of two parallel support rails operating in unison but driven by independent stall motors.

The transference of a loose cam as a means of reversing the action is simple and demonstrates the working principle but more elegant mechanisms of reversal without the use of loose cams may be devised.

A system for the automatic reversal of the mode of action of the hook catch arrangement by means of a trip mechanism actuated after transport of the final plate in a particular direction has been complete also forms part of the invention.

One such alternative mechanism involves two hooks mounted facing each other at the same height and which are alternately raised into and lowered away from a position in which they can engage and transport the plates by means of a weight the point of influence of which is transferred from one hook to the other by means of a trip mechanism actuated after transport of the last plate in a particular direction has been completed.

A specific embodiment of such a mechanism and its mode of action is illustrated in FIGS. 5 to 11 which are all side views of a filter press showing the hook catch mechanism in various stages of operation.

Referring to the drawings there are provided a series of stacked plates 9 resting by way of lugs 8 on a horizontal support rail (not shown). Lugs 8 are mounted slightly above the centre of gravity of the plates. Parallel to the horizontal support rail is provided a track rail 10 which carries the hook-catch mechanism. The hook catch mechanism itself comprises a backing plate 2 (dotted) bearing hooks 1 and 1a which are pivoted at 3 and 3a and a rocker arm 6 which is pivoted at 11 and which is itself mounted on a semi-circular plate 13 provided with movable stops 12 and 12a. Also pivoted at 11 is strut 4 bearing weight 5, the centre of gravity of strut and weight being above the pivot 11. Backing plate 2 also bears fixed stops 7 and 7a. The hook-catch mechanism is moved along the track rail by a chain, driven by a reversible stall-motor (not shown).

Figure 10:
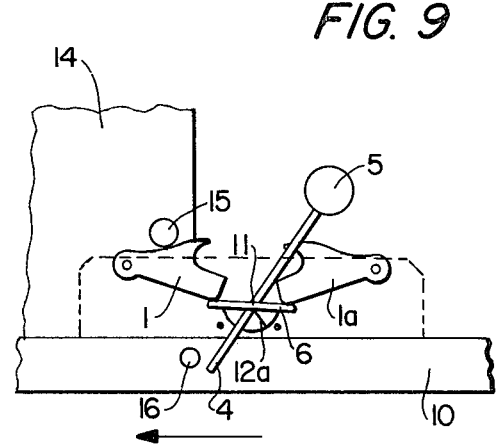
Figure 11:
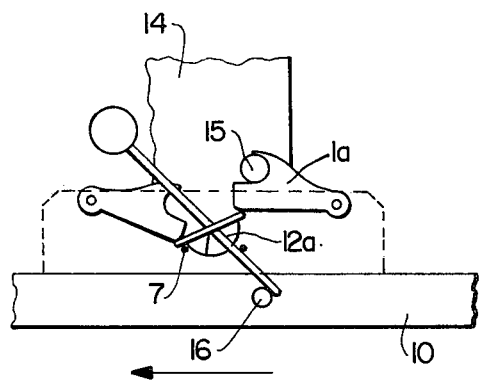

A headstock 14 bearing a dummy lug 15 is situated at either end of the press. Rail 10 is provided with a trip bar 16 situated beneath the headstock. Only one such headstock is shown (FIGS. 10 and 11).

The arrows beneath each figure indicate the direction of motion of the hook-catch mechanism during or immediately prior to the situation shown.

Figure 6:
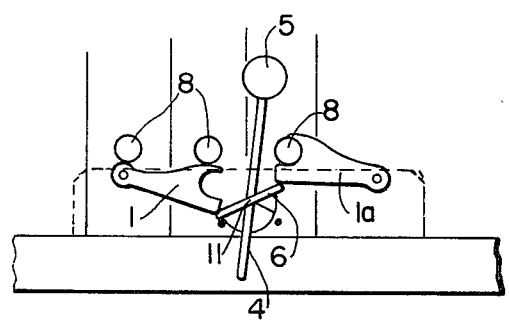
Figure 7:
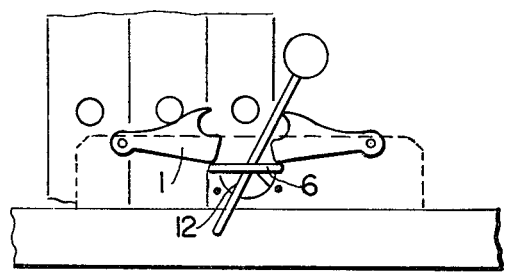
Figure 8:
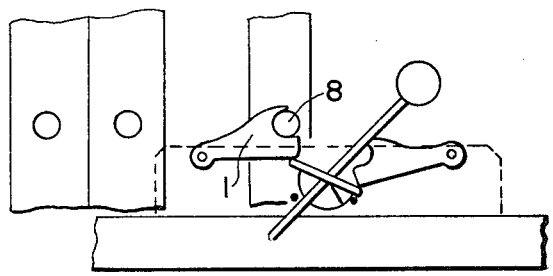
Figure 9:
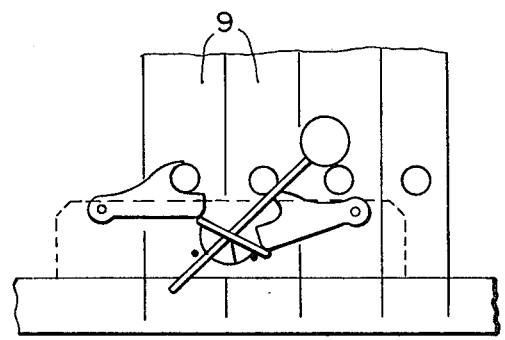

In operation the hook-catch arrangement proceeds towards the stacked plates 9 (FIG. 5,) hook 1 being raised by the action of weight 5 and strut 4 on stop 12 and rocker arm 6, stop 7a preventing rocker arm 6 going beyond the lip of hook 1 as shown. In FIG. 6 hook 1 is depressed by lug 8 on the second plate thus causing rocker arm 6 to tilt about pivot 11 and raising hook 1a to engage with lug 8 on the first plate, the centre of gravity of strut 4 and weight 5 remaining on the side of hook 1a. The motor stalls and reverses, allowing hook 1 to be raised between the lugs on the first and second plates by means of the action of strut 4 and weight 5 on stop 12 and rocker arm 6 (FIG. 7). Hook 1 engages lug 8 on the first plate and transport begins (FIG. 8). When the plate 9 being transported presses against another plate 9 (FIG. 9) the motor stalls and reverses, returning the hook catch mechanism to the position shown in FIG. 5 and the sequence is repeated. FIG. 10 shows the situation after transport of the final plate when strut 4 is arrested by trip bar 16 causing pivoting about 11 which transfers the centre of gravity of strut 4 and weight 5 to the side of hook 1. This in turn causes strut 4 to act by way of stop 12a on rocker bar 6 thus raising hook 1a to engage dummy lug 15 (FIG. 11), stop 7 preventing movement of the rocker arm beyond the tip of hook 1a.

At this point the backing plate 2 (dotted) engages a limit switch (not shown) which stops the driving motors until restarted by the operator. When restarted the sequence of operations is repeated in reverse to transport the plates from right to left (referring to FIGS. 5 to 11) because the action of the weight 5 now tends to raise hook 1a.

After transport of the final plate from right to left a similar trip bar 16 situated at the other end of the press (not shown) transfers the centre of gravity of strut 4 and weight 5 back to the side of hook 1a, thus tending to raise hook 1. Also another limit switch (not shown) arrests the driving motors until restarted by the operator when transport of the plates will again be from left to right (referring to diagrams FIGS. 5 to 11).

A corresponding hook-catch mechanism is present on the opposite side of the press operating in unison but driven by a separate motor.

What we claim is:

1. A filter press comprising:
   first and second parallel horizontal support rails;
   a plurality of filter material carrying plates, each said plate having on first and second opposite sides thereof respective first and second lugs resting on said first and second support rails, respectively, said plates being aligned in a row extending along said support rails, each said plate being movable independently and without connection to adjacent said plates in a first direction toward first ends of said support rails and in a second direction toward second ends of said support rails;
   first and second first hook means, mounted adjacent said first and second support rails, respectively, for movement therealong in said first and second directions, for engagement with said first and second lugs, respectively, of a selected said plate to move said selected plate in said first direction;
   first and second second hook means, mounted adjacent said first and second support rails, respectively, for movement therealong in said first and second directions, for engagement with said first and second lugs, respectively, of a selected said plate to move said selected plate in said second direction;
   first moving means supporting said first first hook means and said first second hook means adjacent said first support rail for movement therealong in said first and second directions;
   second moving means supporting said second first hook means and said second second hook means adjacent said second support rail for movement therealong in said first and second directions;
   first stall motor means operatively connected to said first moving means for driving said first moving means in said first and second directions;
   second stall motor means, separate from said first stall motor means, operatively connected to said second moving means for driving said second moving means in said first and second directions;
   whereby, when said plates are to be moved in said first direction, said first and second stall motor means operate to drive said first and second moving means in said first direction, and said first and second first hook means engage first and second lugs of a first plate and move said first plate in said first direction to a predetermined location whereat such movement is arrested and said first and second first hook means cause said first and second stall motor means to stall and reverse movement, to thereby drive said first and second moving means in said second direction until said first and second hook means abut first and second lugs of a second plate and cause said first and second stall motor means to stall and again reverse movement, to thereby again drive said first and second moving means in said first direction and cause said first and second first hook means to engage said first and second lugs of said second plate and move said second plate in said first direction, said operations being repeated until all of said plurality of plates are separately and independently moved in said first direction; and
   whereby, when said plates are to be moved in said second direction, said first and second stall motor means operate to drive said first and second moving means in said second direction, and said first and second second hook means engage first and second lugs of a first plate and move said first plate in said second direction to a predetermined location whereat such movement is arrested and said first and second second hook means cause said first and second stall motor means to stall and reverse movement, to thereby drive said first and second moving means in said first direction until said first and second first hook means abut first and second lugs of a second plate and cause said first and second stall motor means to stall and again reverse movement, to thereby again drive said first and second moving means in said second direction and cause said first and second second hook means to engage said first and second lugs of said second plate and move said second plate in said second direction, said operations being repeated until all of said plurality of plates are separately and independently moved in said second direction.

2. A filter press as claimed in claim 1, wherein said first and second moving means comprise separate first and second endless chains mounted adjacent said first and second support rails, respectively.

3. A filter press as claimed in claim 1, wherein each of said hook means comprises a single unitary pivotally mounted hook member.

4. A filter press as claimed in claim 1, wherein said first first hook means and first second hook means are pivotally mounted on a first backing plate, and said second first hook means and said second second hook means are pivotally mounted on a second backing plate.

5. A filter press as claimed in claim 4, further comprising, on each of said first and second backing plates, a rocker arm pivotally mounted on a pivot to said backing plate between the respective hook means thereof, said rocker arm having opposite ends bearing against lower surfaces of said hook means, said rocker arm having first and second movable stops, a strut pivotally mounted at said pivot, said strut having at an upper end thereof weight means for biasing said strut to move in either of opposite directions about said pivot, thereby moving a lower end of said strut against either of said first or second movable stops, and first and second fixed stops on said backing plate for limiting the extent of movement of said strut about said pivot.

* * * * *